DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 274

T904,018

COATING COMPOSITIONS

Keith W. Kroon and George P. Kasper, both % Eastman Kodak Co., Kodak Park Division, Rochester, N.Y. 14650

Filed Mar. 4, 1971, Ser. No. 121,119
Int. Cl. H01j *1/62*
U.S. Cl. 250—80
No Drawing. 16 Pages Specification

Coating compositions comprising nearly equal parts, by weight, of a mixture of (1) a polymethylmethacrylate with (2) a copolymer of ethylacrylate, acrylic acid and acrylonitrile are disclosed. When used in radiographic elements like phosphorescent screens they exhibit high flexibility and provide good protection as a clear, bubble free layer when coated from an aqueous dispersion or latex containing from about 5 percent to about 40 percent by weight of said mixed polymers.

The phosphorescent screens protected with these overcoats can be used in combination with light sensitive radiographic elements which in turn exhibit improved optical and physical characteristics.

Silver halide emulsions and elements useful in integral or non-integral combination with the above-screens can be chemically sensitized, e.g. with noble metal sensitizers alone or in combination with sulfur or selenium sensitizers. They can contain spectral sensitizers, incorporated color-forming couplers, incorporated developing agents, antifoggants, hardeners, plasticizers, coating aids, vinyl polymers, and other suitable photographic addenda such as described in U.S. Pat. 3,297,446 of Dunn issued Jan. 10, 1967 (columns 4 to 9).